United States Patent
Schreiber et al.

(10) Patent No.: US 9,063,539 B2
(45) Date of Patent: Jun. 23, 2015

(54) METHOD AND DEVICE FOR COMMAND INPUT IN A CONTROLLER OF A MANIPULATOR

(75) Inventors: Günter Schreiber, Friedberg (DE); Uwe Zimmermann, Augsburg (DE)

(73) Assignee: Kuka Laboratories GmbH, Augsburg (DE)

( * ) Notice: Subject to any disclaimer, the term of this patent is extended or adjusted under 35 U.S.C. 154(b) by 852 days.

(21) Appl. No.: 13/140,708

(22) PCT Filed: Nov. 3, 2009

(86) PCT No.: PCT/EP2009/007873
§ 371 (c)(1),
(2), (4) Date: Sep. 6, 2011

(87) PCT Pub. No.: WO2010/069429
PCT Pub. Date: Jun. 24, 2010

(65) Prior Publication Data
US 2011/0313573 A1    Dec. 22, 2011

(30) Foreign Application Priority Data

Dec. 17, 2008  (DE) .......................... 10 2008 062 622
Feb. 3, 2009   (DE) .......................... 10 2009 007 181

(51) Int. Cl.
*G01M 1/38*     (2006.01)
*G05B 13/00*    (2006.01)
(Continued)

(52) U.S. Cl.
CPC ............. *G05B 19/423* (2013.01); *B25J 9/1656* (2013.01); *G05B 2219/36433* (2013.01); *G05B 2219/39439* (2013.01)

(58) Field of Classification Search
CPC .............................. G05B 15/02; G05B 19/423
USPC ........ 700/254, 275, 286, 245, 246; 318/568.2
See application file for complete search history.

(56) References Cited

U.S. PATENT DOCUMENTS 4,396,987 A * 8/1983 Inaba et al. .................... 700/249
4,621,332 A * 11/1986 Sugimoto et al. ............. 700/260
(Continued)

FOREIGN PATENT DOCUMENTS

| DE | 32 11 992 A1 | 10/1983 |
|----|--------------|---------|
| DE | 195 47 121 A1 | 5/1996 |
| JP | 59157715 A | 9/1984 |

OTHER PUBLICATIONS

"Programming by Touch: The Different Way of Human-Robot Interaction," Grunwald et al., IEEE Trans. on Industrial Electronics, vol. 50, No. 4, (2003) pp. 569-666.

(Continued)

*Primary Examiner* — Mohammad Ali
*Assistant Examiner* — Ziaul Karim
(74) *Attorney, Agent, or Firm* — Schiff Hardin LLP (57) ABSTRACT

In a method and a device for entering control commands into a controller of a manipulator, such as a robot, a first force or movement or sequence of forces or movements is detected, and the detected force, movement or sequence is electronically compared with stored forces, movements or sequences, respectively. Each of the stored forces or movements or sequences has a control command associated therewith. Upon the comparison indicating a coincidence between the detected force or movement or sequence with one of the stored forces or movements or sequences, the control command associated with that one of the stored forces, stored movements or stored sequences is automatically supplied as an input to the controller for operating the manipulator.

40 Claims, 2 Drawing Sheets

(51) Int. Cl.
  *G05B 15/00* (2006.01)
  *G06F 19/00* (2011.01)
  *G05B 19/04* (2006.01)
  *G05B 19/18* (2006.01)
  *G05B 19/423* (2006.01)
  *B25J 9/16* (2006.01)

(56) References Cited

U.S. PATENT DOCUMENTS

| | | | |
|---|---|---|---|
| 4,860,215 A * | 8/1989 | Seraji | 700/260 |
| 4,999,553 A | 3/1991 | Seraji | |
| 5,276,390 A * | 1/1994 | Fisher et al. | 318/568.1 |
| 5,294,873 A * | 3/1994 | Seraji | 318/568.1 |
| 6,181,983 B1 * | 1/2001 | Schlemmer et al. | 700/245 |
| 6,317,651 B1 | 11/2001 | Gerstenberger et al. | |
| 6,385,508 B1 | 5/2002 | McGee et al. | |
| 6,496,756 B1 * | 12/2002 | Nishizawa et al. | 700/264 |
| 7,646,161 B2 | 1/2010 | Albu-Schaffer et al. | |
| 8,909,374 B2 * | 12/2014 | Fudaba et al. | 700/257 |
| 2002/0120363 A1 | 8/2002 | Salisbury et al. | |
| 2005/0246062 A1 | 11/2005 | Keibel | |
| 2006/0293790 A1 | 12/2006 | Gienger | |
| 2008/0188985 A1 * | 8/2008 | Sakano | 700/260 |

OTHER PUBLICATIONS

"Force Control of Redundant Robots in Unstructured Environment," Nemec et al., IEEE Trans. on Industrial Electronics, vol. 48, No. 1 (2002) pp. 253-260.

"Tactile Gestures for Human/Robot Interaction," Voyles, Jr. et al., Proc. of IEEE/RSJ Intelligent Robots and Systems Conference, vol. 3 (1995).

* cited by examiner

Fig. 1

METHOD AND DEVICE FOR COMMAND INPUT IN A CONTROLLER OF A MANIPULATOR

BACKGROUND OF THE INVENTION

1. Field of the Invention

The present invention concerns a method and a device to input one or more commands in a controller of a manipulator.

2. Description of the Prior Art

As used herein, a manipulator encompasses single-axis or multi-axis robots, measurement and tool machines, for example non-driven coordinate measurement machines. Such manipulators generally have a controller to execute specific movements, for example to traverse predetermined trajectories, to store specific measurement positions or the like. Therefore a regulator—for example a force or position regulator of a robot—is also designated herein as a controller.

To operate the manipulator it is necessary to enter one or more commands as an input into such a controller. For example, commands to occupy specific positions, to travel predetermined trajectories, to activate tools (for instance to open or close a gripper or to activate an electrode holder, a drilling head or cutting head or the like) are input in a robot controller. Commands to begin a feed, to change a rotation speed of a work piece or tool or the like are input into a tool machine in a corresponding manner; commands to start or end a data recording are correspondingly input into a measurement machine. Such commands can act directly at the manipulator via the controller or be stored in the form of a program in order to be subsequently converted by the controller into a desired action of the manipulator.

To enter commands that determine a work process of a robot—for example occupying an initial position, the activation of a cutting tool, the traversing of a predetermined trajectory to process a work piece with the cutting tool, the deactivation of the cutting tool and the return into a neutral position—it is known (for example from EP 0 850 730 B1) to manually move the robots into the desired initial position and to subsequently move along the trajectory to be traversed or to move to points on this trajectory. In order to enter commands (for example the storage of the current position as a desired position, the activation of a tool or the movement into a neutral position), in this method known as direct programming ("direct teaching"), an additional keyboard or the like has conventionally been required via which the operator manually directing the robot enters the corresponding commands. This not only requires additional equipment and increased transfer cost between the input apparatus and the controller but also hinders the operator in the direct programming since the operator must move or release the robot one-handed to operate the keyboard.

SUMMARY OF THE INVENTION

It is an object of the present invention to simplify a command input into a controller of a manipulator.

The present invention is based on the insight to enter commands directly via corresponding contacts with the manipulator. While it has previously been known (for example from EP 0 850 730 B1) only to move a robot by sliding its end effector in the direction of the force acting on the end effector, the present invention enables the input of additional commands (in particular commands that do not pertain to any movement and more complex commands). This is accomplished according to the invention by comparing an acting force or movement or sequence, a first force that acts on the manipulator, a sequence of a first force and a second force that act in succession on the manipulator, a first movement of the manipulator, or a sequence of a first and a second movement of the manipulator with stored forces, movements or sequences with which a command is respectively associated. If a force, movement or sequence is detected that corresponds to a stored force, movement or sequence, this is detected as an input of the command associated with this stored force, movement or sequence, and this command is emitted as an output to the controller of the manipulator.

In a first embodiment of the present invention, forces that an operator exerts on the manipulator in predetermined directions are detected (for example via force sensors). For a more succinct presentation, opposite and identical force pairs (i.e. torques) are likewise generally designated as forces in the following. For example, when a force sensor is discussed in the following, this can be a torque sensor.

For example, such force sensors can be provided at an end effector of the manipulator, a guide handle connected with the manipulator or a motor of the manipulator and there can detect acting forces that an operator exerts directly on the end effector or the guide handle or indirectly on motors of the manipulator, for example via the end effector or the guide handle.

For example, if a conventional industrial robot is equipped with a rigid position regulator that holds the robot in its current position or fixes a non-driven coordinate measurement machine with brakes in a position, the robot or machine essentially cannot be manually moved by an operator. In this case the detection (explained in the preceding) of the forces acting on the manipulator in the predetermined directions is particularly advantageous. For example, an operator can initially pull with a predetermined minimum force on an element of the robot in a first direction (detected directly at the robot element by a force sensor or indirectly by force sensors in the drives of the robot) and subsequently push on the robot element in a second direction (detected by the same or different force sensors). If this sequence of a first force in the first direction and a second force in the second direction is stored as a sequence with which a specific command is associated (for example the release of a brake of a motor of the robot or the modification of the parameters of the position regulator), according to the invention the forces exerted by the operator on the end effector, in the stored order are regarded as an input of the associated command. For example, it is thus possible to flexibly switch a rigidly connected robot by repeatedly pulling on a robot element in defined directions, which is possible (for example) by omitting an integral component and reducing the proportionality constant in a proportional integral differential (PID) position regulator of the robot.

In the first embodiment in which the forces are detected, it is not necessary for the manipulator to move at all (or in any case significantly) under the forces exerted on it by the operator to input a command. For example, this is advantageous given measurement machines in which the command input according to the invention should not lead a movement of the measurement machine from a position that has just been occupied.

Moreover, the lack of feedback of a manipulator that does not (or in any event does not markedly) react to forces exerted on it at the command input hinders the operation since, for example, due to a movement of the manipulator the operator cannot detect whether he or she has already exerted a sufficient first force in the first direction or not.

In a second embodiment of the present invention, movements of the manipulator are detected instead of forces exerted on the manipulator. For this purpose, in the second embodiment of the present invention a movement of the manipulator in a first movement direction and (in a version of the second embodiment) a subsequent movement of the manipulator in a second movement direction are also detected and compared with stored movements in the first movement direction or sequences of movements in the first and second movement direction with which a command is respectively associated. If the detected movement or movement sequence coincides with a stored movement or movement sequence, i.e. if the manipulator is moved by the operator in a manner with which a specific command is associated, this command is output to the controller of the manipulator.

For this purpose, the manipulator is advantageously flexibly designed, i.e. can be manually moved in detectable measurements due to forces exerted on it at the input of commands by the operator. For example, as described in the preceding this can be realized by a purely proportional position regulation with correspondingly low proportionality constants. Such a flexible manipulator can also similarly be force-regulated. For example, for this the forces can be calculated in its controller using a mathematical analogous model, which forces directly compensate weight and friction forces in its current position. If these forces sent as desired values to the force regulators of the motors of the manipulator, the manipulator can already be moved out of its current position via relatively small forces. An additional possibility to make it possible to flexibly detect the movement of a manipulator— i.e. via the forces exerted on it to input a command—is to detect the forces exerted on it and react to these with a corresponding movement in the direction of these forces, and advantageously with a movement velocity corresponding to the magnitude of the forces.

Given such a flexible manipulator, the forces exerted on it to input a command thus lead to a measurable movement of the manipulator that can advantageously also be detected by the operator. The operator receives a feedback about the forces that he exerts. In particular, via a corresponding movement of the manipulator in a first movement direction he detects that he has sufficiently moved the manipulator in the first direction in order to input the command associated with this stored movement. In the development of the second embodiment, the operator can then move the manipulator in the second direction corresponding to the stored sequence in order to input the command associated with this stored sequence.

In particular given flexible manipulators, the movement in the first or second direction can be a movement of the manipulator into what is known as its null space, i.e. the set of all positions or poses of the manipulator that are realized as identically defined end effector positions. If the manipulator is redundant, i.e. if it has more degrees of freedom (for example more joints) than are required to realize a defined end effector position, a flexible manipulator can be moved by an operator in its elements (i.e. be transformed into various positions in null space) without the end effector varying its defined position in Cartesian space. Such a movement that does not vary the position of the end effector (and thus, for example, a work point of a robot) is particularly suitable to input a command.

For example, a six-axis industrial robot is redundant with regard to an end effector position in which the orientation of its end effector is not predetermined by the sixth joint axis due to a symmetrical tool. For instance, here a rotation of its end effector around the sixth joint axis could be selected as a first direction so that a rotation of the end effector by a defined angle is detected as a movement in the first direction and is compared with stored movements (for example rotation angles) in order to input a command.

In a preferred embodiment of the present invention, a stored force, movement or sequence includes the size of the forces or movements (i.e. their magnitude and/or direction), its time curve (in particular its chronological variation) and/or the time interval between the forces or movements. For example, a stored movement can include the velocity (i.e. the change of the position of the manipulator over time), the acceleration (i.e. the change of the velocity of the manipulator over time) and/or a higher derivative with respect to time.

The number of commands that can be encoded by the sequence markedly increases. Additionally, by taking into account the magnitude of the time curve or of the time interval it is advantageously possible to differentiate forces or movements that are applied or executed according to the invention to input a command from those forces or movements that are exerted on this or, respectively, are executed with this for other purposes, for example to advance a robot into a desired position within the scope of a direct programming.

For example, by repeatedly briefly or quickly pulling back and forth at the end effector of a manipulator (meaning that a high velocity or acceleration are switched between in an input mode) in which additional forces or movements are interpreted exclusively as a command input. By repeatedly drawing the end effector back and forth briefly or quickly (i.e. high velocities or accelerations again), the process can switch back into a normal mode again in which the end effector of the manipulator can be brought manually into desired positions.

The first and second force direction or movement direction do not necessarily differ from one another. For example, a command can likewise be input by rotating the end effector by 90° in a rotation direction, followed by a short pause and a subsequent rotation of the end effector by an additional 90° in the same rotation direction.

The forces, movements or sequences associated with the commands are thereby advantageously selected so that they generally do not occur in the normal operation of the manipulator, for example in the direct programming of a robot via manual movement of its end effector. For example, this can take place by repeatedly exerting a force or movements of the manipulator in the same or in opposing directions.

The force or movement directions can be predetermined in a coordinate system fixed in terms of inertia or manipulator. For example, a force that is exerted in a spatial direction on an end effector of a manipulator or a movement of the end effector by the operator in this spatial direction can always be detected as force or movement in the first direction, independent of the respective position of the manipulator and the attitude of its end effector. A force or movement direction can similarly also be defined relative to the manipulator, such that (for example) a pull on the end effector in the direction of its rotation axis is always detected as a force or movement in the first direction, independent of the position of the manipulator, i.e. independent of the orientation of the rotation axis of the end effector in space.

It is generally preferred that the predetermined force or movement directions correspond to movement possibilities of the manipulator in its joints. For example, the first and/or second direction can be defined by a movement of the manipulator in a joint or by coordinated (for example parallel, counter-rotating or complementary) movements of the manipulator in multiple joints, for instance as a rotation $q_2$ of a manipulator element around a pivot joint axis or as rotations $q_3=2q_2$ in two successive, parallel pivot joint axes, via which a straight line in Cartesian space is traveled.

Commands can be entered very simply and intuitively by storing and comparing forces or, respectively, movements in a first direction. For example, the pressing of a measurement button of a coordinate measurement machine can be associated with the beginning or end of a measurement recording. A first direction is not necessarily linear in a Euclidean fashion. For example, a first direction can also be an orbit with predetermined orientation in space and/or predetermined radius. If the operator moves an element of a robot to such an orbit around a specific arc length—for example π or 2π—this can be associated with a command, for example the selection of control mode.

A larger command lexicon can advantageously be mapped by storing and comparing sequences of forces or movements in a first and second direction, and in particular sequences can be stored with commands that do not or seldom occur in normal operation of the manipulator. Commands can be associated with such sequences in addition or as an alternative to forces or movements in a first direction, which commands exist in order to provide an intuitive and quickly learnable command lexicon. This is particularly suitable in the case of storage and comparison exclusively of forces or movements in a first direction, in order to reduce the danger of unintentional command inputs via the accidental movement or admission of force in a first direction (in particular given storage and comparison exclusively of force or movement sequences in a first and second direction. It is also suitable in order to provide a very large command lexicon. This is particularly suitable in the case of storage and comparison of both forces and movements in a first direction and of force or movement sequences in a first direction and a second direction.

The present invention is not limited to sequences of two forces successively exerted on the manipulator or, respectively, movements executed with this. In particular, correspondingly more complex sequences can be stored for coding an even more comprehensive command lexicon, such that three or more forces can be successively exerted on the manipulator in a predetermined direction to input a command from such a command lexicon or must be executed with these successive three predetermined movements.

It can be necessary to differentiate from the outset forces or movements that—to input a command on the controller of the manipulator—are exerted on the manipulator or are executed with the manipulator from other forces that, for example, are executed accidentally and unintentionally or serve for the mere movements of a flexible manipulator, or from movements that (for example) serve for the transport into a desired work position of the manipulator. In a preferred embodiment of the present invention this is done by a guide handle with which forces can be exerted on the manipulator or with which the manipulator can be moved. The guide handle has an input device to input a signal allowing switching between a normal mode and a command input mode. Such a guide handle is preferably permanently or detachably connected with the manipulator, for example welded, bolted or affixed to its end effector.

In the command input mode (which can be switched by a single, repeated or continuous activation of the input device), each force exerted on the manipulator or each movement executed with the manipulator is considered as part of a sequence that serves to input a command. In contrast to this, in normal mode forces acting on the manipulator or movements executed with these are not considered as serving for command input. This enables the forces acting on the manipulator or movements executed with the manipulator to be detected only during the command input mode. This prevents a command being entered unintentionally by a force or movement sequence during the normal mode (for example in which a robot is manually directed into a desired position).

The forces exerted on the manipulator or movements executed with this can similarly also be continuously detected. Thus a sequence that is executed by the operator (for example during a direct programming) and that coincides with a stored sequence, is detected as a sequence for command input (independent of the activation of an input device or switching into a command input mode), and the associated command is output to the controller of the manipulator.

According to a preferred embodiment of the present invention, the safety of the command input can be additionally increased by a two-stage movement. For this purpose, the operator is given feedback about the command input by a force he exerts or a movement of the manipulator that the operator induces. The operator must react with an affirmative input, for example the confirmation of an input device, an acoustic response or an additional command input by means of the method according to the invention. Only in the event that the command has been confirmed by the operator is the command associated with the stored force, movement or sequence output to the controller of the manipulator. For example, the feedback can take place visually (for example via a display), acoustically (for instance via output of a spoken sequence) and/or haptically (for instance via vibration of the manipulator). The danger of inadvertent incorrect command inputs (for instance due to a confusion of the associated sequences) is reduced.

Such a feedback is also in particular advantageous in order to input more complex commands in stages and successively. For example, the position of the robot in which it should execute a specific command should frequently be stored with regard to said command of said robot (for instance "touch up"). For this purpose, in a preferred embodiment of the present invention the command can initially be input according to the invention via a force, movement or sequence. The manipulator is subsequently moved by the operator into the position provided for execution of this command and this is stored, wherein the command input and/or achieving the position to be stored is input by the operator inputting a signal, for instance activating or releasing a switch. For this purpose, after inputting the command and/or storing the associated position of the manipulator a feedback can be output, for instance a visual display or acoustic notification.

The forces exerted or movements executed by an operator to input the command generally do not exactly coincide with stored sequences, in particular with regard to their variables, time curves or time intervals. The stored forces, movements or sequences therefore advantageously have predetermined tolerance fields. This means that a force is exerted by the operator on the manipulator or a movement is executed with the manipulator, of which the direction, magnitude, time curve or time interval from a previously applied force or executed movement differs from the direction, magnitude, time curve or time interval of a stored force, movement or sequence; however, if this difference lies within a predetermined maximum range the comparison of the detected and stored force or movement yields an agreement.

For this purpose, the stored sequences are particularly advantageously divided into simple primitives, for example force or movement upward/downward, to the left/right, forward/backward or the like, such that a force or movement that is essentially directed forward is associated with the primitive "forward". Due to the succession of such primitives (for example "upward"→"right"), more complex commands or a corresponding command grammar can also be reliably entered.

However, other pattern recognition methods can also be used, for example learning methods based on neural networks, fuzzy methods or other pattern recognition methods known from image processing.

DESCRIPTION OF THE PREFERRED EMBODIMENTS

Figure 1:
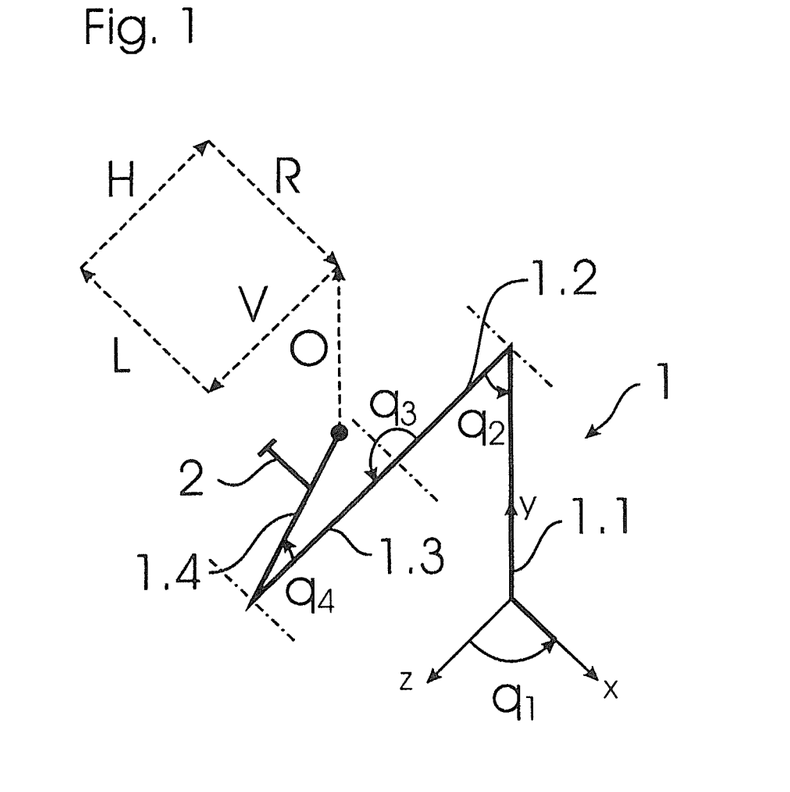
FIG. 1 shows a four-axis manipulator with a command input device according to one embodiment of the present invention given the input of a command.

A four-axis robot is schematically shown in FIG. 1, the body 1.1 of which can rotate around the y-axis of a coordinate system fixed to the robot. An upper arm 1.2 connected with the body rotates relative to this around an axis parallel to an x-axis of the coordinate system fixed on the robot. For this a lower arm 1.3 and an end effector 1.4 are attached to this upper arm or to the lower arm such that said lower arm 1.3 and end effector 1.4 can be rotated relative to the upper arm 1.2 around axes parallel to themselves. A guide handle 2 is attached to an end effector 1.4. A controller of the manipulator is arranged in the body 1.1, in which controller a command input device is implemented according to one embodiment of the present invention.

The robot 1 is flexible, meaning that it can be moved manually by an operator. For this, in the four movement axes of the robot 1 torques can be executed on the axes by force-regulated motors (not shown), which torques compensate for the weights of the end effector 1.4 and of the upper and lower arm 1.2, 1.3 in their respective position. If the operator therefore exerts a force in the y-direction on the guide handle 2, he can simply shift the end effector 1.4 in this direction. If he releases the guide handle, the robot 1 remains in the new position.

In the exemplary embodiment the "touch up" command should be input in a controller (not shown) of the robot 1. For this the operator moves the end effector 1.4 (by means of the guide handle 2) into the manner indicated with dashed lines in FIG. 1, initially quickly upward (i.e. in the y-direction of the coordinate system fixed to the robot) and then forward (i.e. in the z-direction of the coordinate system fixed to the robot).

This movement is detected by resolvers in the four movement axes of the robot (not shown). Since such a sequence of quick, orthogonal movements normally does not typically occur given direct programming of a robot (i.e. a manual movement of its end effector into desired positions), the command "touch up" is associated with this movement series "up"→"forward".

Figure 2:
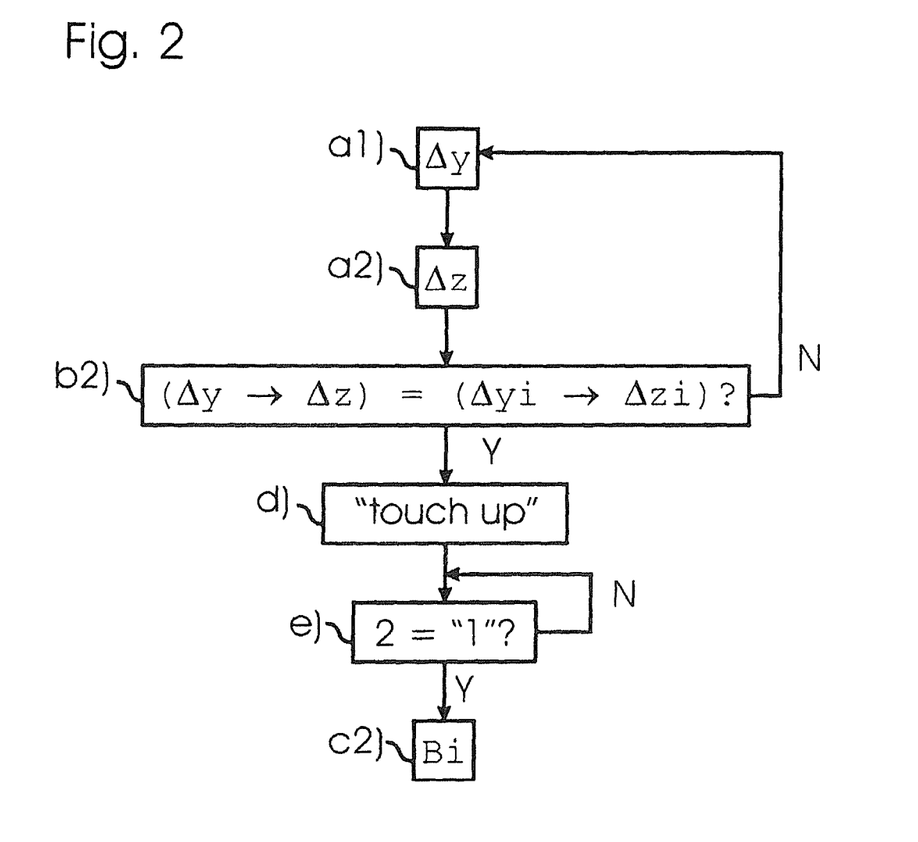
FIG. 2 is a flow diagram of a method according to one embodiment of the present invention.

According to the invention, during a direct programming of the robot a first movement Δy in a first movement direction y is detected in Step a1) and, immediately following this, a second movement Δz in a second movement direction z is detected in Step a2) (FIG. 2). This movement sequence is compared with the stored movement sequences in Step b2). Since it coincides with the stored movement sequence that is associated with the "touch up" command (Step b2): "Y"), in Step d) the acquired command is acoustically output by means of speech output. If the detected movement sequences coincides with no stored movement sequence (Step b2): "N"), the device returns to Step a1).

In order to confirm the acoustically output command, in Step e) the operator pushes an input device on the guide handle 2 in the form of a button (not shown). Only after this confirmation of the command Bi (Step e): "Y") is this output to the controller in Step c2), which integrates it correspondingly into the workflow program created by the direct programming.

In one variation the command "Start CIRC" should be input. For this command the movement sequence "up"→"small circle" is stored. The operator accordingly initially directs the end effector 1.4 by means of the guide handle 2 in the manner indicated with a dashed line in FIG. 1, initially upward and subsequently forward, to the left, backwards and to the right in order to input this movement sequence. Since such a trajectory of the end effector 1.4 can also be provided for a processing process, at the beginning of the movement sequence explained above (i.e. before he moves the end effector 1.4 upward) the operator activates the input device at the guide handle 2 by pressing the button (not shown) and keeping it pressed during the aforementioned movement sequence. The command input device detects that the movement sequence executed while operating the button serves for the command input. The command input device detects the movements "up", "forward", "left", "backward" and "right" and associates this movement sequence with the command "Start CIRC". The command input device outputs this command to the controller of the robot 1, which integrates this command into the workflow program of the robot that is created via direct programming.

In a further modification of the exemplary embodiment described in the preceding, the force regulator of the robot 1 is fashioned to be rigid, such that the operator cannot or, respectively, cannot perceptibly move the end effector 1.4 manually. For this the four movement axes of the robot 1 are position-regulated with high amplifications by PD regulators.

If the operator now exerts a force Fy in the y-direction on the guide handle 2, the end effector 1.4 does not move. Force sensors (not shown) of the force-regulated motors nevertheless register a corresponding force acting on the end effector 1.4 in the four movement axes. From this, after eliminating the weights of the robot the first force exerted by the operator on the end effector 1.4 in the y-direction can be detected using a mathematical analogous model.

After the operator has applied the first force Fy for a certain period of time, he pulls on the guide handle 2 in the z-direction. Although as before the end effector 1.4 of the rigidly regulated robot 1 does not move, a second force Fz that acts on the manipulator in the second direction is analogously detected by the force sensors in the motors.

The command Bi="touch up" is likewise associated with the sequence Fyi →Fzi of a first force Fy in the y-direction followed by a second force Fz in the z-direction. By the application of forces to the manipulators by the operator, a command can also be input when the rigid manipulator does not move or does not detectably move under these forces.

Although modifications and changes may be suggested by those skilled in the art, it is the intention of the inventors to embody within the patent warranted heron all changes and modifications as reasonably and properly come within the scope of their contribution to the art.

We claim as our invention:
1. A method for command input into a controller of a manipulator, comprising:

detecting a first force (F1) that acts on the manipulator in a first direction;
electronically comparing the detected first force in a processor with a plurality of stored forces that each have a different command, among a plurality of different commands, associated therewith, to obtain a comparison result; and
upon said comparison result indicating that the detected first force coincides with one of said stored forces, automatically supplying the command that is associated with said one of said stored forces from the processor to the controller as a supplied command and, in said controller, interpreting the supplied command as an input command and emitting a control signal from said controller having a signal content configured to cause said manipulator to operate according to said input command.

2. A method as claimed in claim 1 comprising detecting said first force as a force characteristic selected from the group consisting of magnitude, time curve, change with respect to time, and time duration, and storing, as said stored forces, respective magnitudes, time curves, changes with respect to time, and time durations.

3. A method as claimed in claim 1 comprising:
detecting a second force (F2) that acts on the manipulator in a second direction after said first force has acted on said manipulator;
electronically comparing a sequence (F1→F2) of the detected first force and the detected second force in said processor with a plurality of stored sequences that each have a different command, among said plurality of different commands, associated therewith, to obtain a further comparison result; and
upon said further comparison result indicating that the detected sequence coincides with one of the stored sequences, additionally automatically supplying the command associated with said one of said stored sequences from the processor to the controller as another supplied command and, in said controller, interpreting said another supplied command as another input command and emitting another control signal from said controller, said another control signal having a signal content configured to cause said manipulator to operate according to said another input command.

4. A method as claimed in claim 3 comprising continuously comparing the detected first force with the stored forces and continuously comparing the detected sequence with said stored sequences.

5. A method as claimed in claim 3 comprising comparing said detected first force with said stored forces and comparing the detected sequence with the stored sequences only in a command input mode of said controller.

6. A method as claimed in claim 5 comprising activating said command input mode in said controller by user interaction with an input device of said controller.

7. A method as claimed in claim 1 comprising continuously comparing the detected first force with the stored forces.

8. A method as claimed in claim 1 comprising comparing the detected first force with the stored forces only in a command input mode of said controller.

9. A method as claimed in claim 8 comprising activating said command input mode in said controller by user interaction with an input device of said controller.

10. A method for command input into a controller of a manipulator, comprising:
detecting a first force (F1) that acts on the manipulator in a first direction;
detecting a second force (F2) that acts on the manipulator in a second direction after the first force has acted on the manipulator;
electronically comparing a sequence (F1→F2) of the detected first force and the detected second force in a processor with a plurality of stored sequences each having a different command, among a plurality of different commands, associated therewith, to obtain a comparison result; and
upon said comparison result indicating that the detected sequence coincides with one of the stored sequences, automatically supplying the command associated with said one of said stored sequences from said processor to said controller as a supplied command and, in said controller, interpreting the supplied command as an input command and emitting a control signal from said controller having a signal content configured to cause said manipulator to operate according to said input command.

11. A method for command input into a controller of a manipulator, comprising:
detecting a first movement ($\Delta1$) that acts on the manipulator in a first direction;
electronically comparing the detected first movement in a processor with a plurality of stored movements that each have a different command, among a plurality of different comments, associated therewith, to obtain a comparison result; and
upon said comparison result indicating that the detected first movement coincides with one of said stored movements, automatically supplying the command that is associated with said one of said stored movements from the processor to the controller as a supplied command and, in said controller, interpreting the supplied command as an input command and emitting a control signal from said controller having a signal content configured to cause said manipulator to operate according to said input command.

12. A method as claimed in claim 11 comprising detecting said first movement as a movement characteristic selected from the group consisting of magnitude, time curve, change with respect to time, and time duration, and storing, as said stored movements, respective magnitudes, time curves, changes with respect to time, and time durations.

13. A method as claimed in claim 11 comprising:
detecting a second movement ($\Delta2$) that acts on the manipulator in a second direction after said first movement has acted on said manipulator;
electronically comparing a sequence ($\Delta1$→$\Delta2$) of the detected first movement and the detected second movement in said processor with a plurality of stored sequences that each have a command, among said plurality of different comments, associated therewith, to obtain a further comparison result; and
upon said further comparison result indicating that the detected sequence coincides with one of the stored sequences, additionally automatically supplying the command associated with said one of said stored sequences from the processor to the controller as another supplied command and, in said controller, interpreting said another supplied command as another input command and emitting another control signal from said controller, said another control signal having a signal content configured to cause said manipulator to operate according to said another input command.

14. A method as claimed in claim 13 comprising continuously comparing the detected first movement with the stored movements and continuously comparing the detected sequence with said stored sequences.

15. A method as claimed in claim 13 comprising comparing said detected first movement with said stored movements and comparing the detected sequence with the stored sequences only in a command input mode of said controller.

16. A method as claimed in claim 15 comprising activating said command input mode in said controller by user interaction with an input device of said controller.

17. A method as claimed in claim 11 comprising continuously comparing the detected first movement with the stored movements.

18. A method as claimed in claim 11 comprising comparing the detected first movement with the stored movements only in a command input mode of said controller.

19. A method as claimed in claim 18 comprising activating said command input mode in said controller by user interaction with an input device of said controller.

20. A method for command input into a controller of a manipulator, comprising:
    detecting a first movement (Δ1) that acts on the manipulator in a first direction;
    detecting a second movement (Δ2) that acts on the manipulator in a second direction after the first movement has acted on the manipulator;
    electronically comparing a sequence (Δ1 →Δ2) of the detected first movement and the detected second movement in a processor with a plurality of stored sequences each having a different command, among a plurality of different commands, associated therewith, to obtain a comparison result; and
    upon said comparison result indicating that the detected sequence coincides with one of the stored sequences, automatically supplying the command associated with said one of said stored sequences from said processor to said controller as a supplied command and, in said controller, interpreting the supplied command as an input command and emitting a control signal from said controller having a signal content configured to cause said manipulator to operate according to said input command.

21. A device for command input into a controller of a manipulator, comprising:
    a force detecting arrangement that detects a first force (F1) that acts on the manipulator in a first direction;
    a processor is configured to compare the detected first force with a plurality of stored forces that each have a different command, among a plurality of different commands, associated therewith, to obtain a comparison result; and
    said processor being configured, upon said comparison result indicating that the detected first force coincides with one of said stored forces to automatically supply the command that is associated with said one of said stored forces from the processor to the controller as a supplied command, and said controller being configured to interpret the supplied command as an input command and to emit a control signal from said controller having a signal content configured to cause said manipulator to operate according to said input command.

22. A device as claimed in claim 21 wherein said force detecting arrangement detects said first force as a force characteristic selected from the group consisting of magnitude, time curve, change with respect to time, and time duration, and wherein said processor is configured to compare the detected force characteristic with respective stored magnitudes, time curves, changes with respect to time, and time durations.

23. A device as claimed in claim 21 wherein:
    said force detecting arrangement detects a second (F2) that acts on the manipulator in a second direction after said first force has acted on said manipulator;
    said processor is configured to electronically compare a sequence (F1→F2) of the detected first force and the detected second force in said processor with a plurality of stored sequences that each have a different command, among said plurality of different comments, associated therewith, to obtain a further comparison result; and
    said processor is configured, upon said further comparison result indicating that the detected sequence coincides with one of the stored sequences, to additionally automatically supply the command associated with said one of said stored sequences from the processor to the controller, and said controller being configured to interpret said another supplied command as another input command and to emit another control signal from said controller, said another control signal having a signal content configured to cause said manipulator to operate according to said another input command.

24. A device as claimed in claim 23 wherein said processor is configured to continuously compare the detected first force with the stored forces and continuously comparing the detected sequence with said stored sequences.

25. A device as claimed in claim 23 wherein said processor is configured to compare said detected first force with said stored forces and comparing the detected sequence with the stored sequences only in a command input mode of said controller.

26. A device as claimed in claim 25 wherein said controller comprises an input device that allows activation of said command input mode in said controller by user interaction with said input device.

27. A device as claimed in claim 21 wherein said processor is configured to continuously compare the detected first force with the stored forces.

28. A device as claimed in claim 21 wherein said processor is configured to compare the detected first force with the stored forces only in a command input mode of said controller.

29. A device as claimed in claim 28 wherein said controller comprises an input device that allows activation of said command input mode in said controller by user interaction with said input device.

30. A device for command input into a controller of a manipulator, comprising:
    a force detecting arrangement that detects a first force (F1) that acts on the manipulator in a first direction;
    said force detecting arrangement also detecting a second force (F2) that acts on the manipulator in a second direction after the first force has acted on the manipulator;
    a processor is configured to compare a sequence (F1→F2) of the detected first force and the detected second force with a plurality of stored sequences each having a different command, among a plurality of different comments, associated therewith, to obtain a comparison result; and
    said processor being configured, upon said comparison result indicating that the detected sequence coincides with one of the stored sequences, to automatically supply the command associated with said one of said stored sequences from said processor to said controller as a supplied command, and said controller being configured to interpret the supplied command as an input command and to emit a control signal from said controller having a signal content configured to cause said manipulator to operate according to said input command.

31. A device for command input into a controller of a manipulator, comprising:
   a movement detecting arrangement that detects a first movement ($\Delta 1$) that acts on the manipulator in a first direction;
   a processor is configured to electronically compare the detected first movement with a plurality of stored movements that each have a different command, among a plurality of different commands, associated therewith, to obtain a comparison result; and
   said processor being configured, upon said comparison result indicating that the detected first movement coincides with one of said stored movements, to automatically supply the command that is associated with said one of said stored movements from the processor to the controller as a supplied command, and said controller being configured to interpret the supplied command as an input command and to emit a control signal from said controller having a signal content configured to cause said manipulator to operate according to said input command.

32. A device as claimed in claim 31 wherein said movement detecting arrangement detects said first movement as a movement characteristic selected from the group consisting of magnitude, time curve, change with respect to time, and time duration, and wherein said processor is configured to compare the detected movement characteristic with respective stored magnitudes, time curves, changes with respect to time, and time durations.

33. A device as claimed in claim 31 wherein:
   said movement detecting arrangement is configured to detect a second movement ($\Delta 2$) that acts on the manipulator in a second direction after said first movement has acted on said manipulator;
   said processor is configured to compare a sequence ($\Delta 1 \rightarrow \Delta 2$) of the detected first movement and the detected second movement in said processor with a plurality of stored sequences that each have a different command, among said plurality of different comments, associated therewith, to obtain a further comparison result; and
   said processor is configured, upon said further comparison result indicating that the detected sequence coincides with one of the stored sequences, to additionally automatically supply the command associated with said one of said stored sequences from the processor to the controller, and said controller being configured to interpret said another supplied command as another input command and to emit another control signal from said controller, said another control signal having a signal content configured to cause said manipulator to operate according to said another input command.

34. A device as claimed in claim 33 wherein said processor is configured to continuously compare the detected first movement with the stored movements and continuously comparing the detected sequence with said stored sequences.

35. A device as claimed in claim 33 wherein said processor is configured to compare said detected first movement with said stored movements and comparing the detected sequence with the stored sequences only in a command input mode of said controller.

36. A device as claimed in claim 35 wherein said controller comprises an input device that allows activation of said command input mode in said controller by user interaction with said input device.

37. A device as claimed in claim 31 wherein said processor is configured to continuously compare the detected first movement with the stored movements.

38. A device as claimed in claim 31 wherein said processor is configured to compare the detected first movement with the stored movements only in a command input mode of said controller.

39. A device as claimed in claim 38 wherein said controller comprises an input device that allows activation of said command input mode in said controller by user interaction with said input device.

40. A device for command input into a controller of a manipulator, comprising:
   a movement detecting arrangement that detects a first movement ($\Delta 1$) that acts on the manipulator in a first direction;
   said movement detecting arrangement also detecting a second movement ($\Delta 2$) that acts on the manipulator in a second direction after the first movement has acted on the manipulator;
   a processor configured to compare a sequence ($\Delta 1 \rightarrow \Delta 2$) of the detected first movement and the detected second movement in a processor with a plurality of stored sequences each having a different command, among a plurality of different commands, associated therewith, to obtain a comparison result; and
   said processor being configured, upon said comparison result indicating that the detected sequence coincides with one of the stored sequences, to automatically supply the command associated with said one of said stored sequences from said processor to said controller as a supplied command, and said controller being configured to interpret the supplied command as an input command and to emit a control signal from said controller having a signal content configured to cause said manipulator to operate according to said input command.

* * * * *